United States Patent
Aso

(10) Patent No.: US 8,401,737 B2
(45) Date of Patent: Mar. 19, 2013

(54) VEHICLE CONTROL DEVICE

(75) Inventor: Makoto Aso, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 824 days.

(21) Appl. No.: 12/225,000

(22) PCT Filed: Dec. 5, 2007

(86) PCT No.: PCT/JP2007/073469
§ 371 (c)(1),
(2), (4) Date: Sep. 11, 2008

(87) PCT Pub. No.: WO2008/072515
PCT Pub. Date: Jun. 19, 2008

(65) Prior Publication Data
US 2009/0287376 A1  Nov. 19, 2009

(30) Foreign Application Priority Data
Dec. 7, 2006 (JP) .................................. 2006-330884

(51) Int. Cl.
*B62D 5/02* (2006.01)
*B62D 5/04* (2006.01)
(52) U.S. Cl. .............. 701/42; 701/60; 180/446; 700/41; 700/43; 700/44
(58) Field of Classification Search .................... 701/42, 701/41, 60; 180/446; 700/41, 43, 44; *B62D 5/02, B62D 5/04*
See application file for complete search history.

(56) References Cited

U.S. PATENT DOCUMENTS

| | | | | |
|---|---|---|---|---|
| 4,842,089 A | * | 6/1989 | Kimbrough et al. | 180/413 |
| 5,228,757 A | * | 7/1993 | Ito et al. | 303/146 |
| 5,251,135 A | * | 10/1993 | Serizawa et al. | 701/42 |
| 5,448,481 A | * | 9/1995 | Asanuma et al. | 701/42 |
| 5,606,502 A | * | 2/1997 | Adachi et al. | 701/36 |
| 5,857,937 A | * | 1/1999 | Ashizawa et al. | 477/46 |

(Continued)

FOREIGN PATENT DOCUMENTS

| | | |
|---|---|---|
| DE | 41 24 654 A1 | 1/1993 |
| DE | 100 36 276 A1 | 2/2002 |

(Continued)

OTHER PUBLICATIONS

"Computational Method of Optimal Control Problem Using Mathematical Programming ($2^{nd}$ Report) Introduction of Block Diagonal Hessian Method," *Journal of Japan Society for Aeronautical and Space Science*, vol. 46, No. 536, 1998, pp. 497-503.

(Continued)

*Primary Examiner* — Tuan C. To
(74) *Attorney, Agent, or Firm* — Oliff & Berridge, PLC

(57) ABSTRACT

A vehicle control device calculates an operation amount and a motion state amount for varying an operation amount necessary for a real vehicle's operation based on a dynamic vehicle model modeling the motion state of a vehicle running in accordance with running targets such as a target path and a speed pattern and determines whether the calculated operation amount and the motion state amount satisfy prescribed running requirements. The operation amount and the motion state amount determined to satisfy the running requirements are a feed-forward (FF) operation amount and a target state amount in a state feedback (FB) control, respectively.

12 Claims, 13 Drawing Sheets

U.S. PATENT DOCUMENTS

| | | | |
|---|---|---|---|
| 6,134,509 A * | 10/2000 | Furusho et al. | 702/167 |
| 6,181,020 B1 * | 1/2001 | Uchida et al. | 290/40 C |
| 6,546,324 B1 * | 4/2003 | Chen et al. | 701/48 |
| 6,926,374 B2 | 8/2005 | Dudeck et al. | |
| 7,269,489 B2 * | 9/2007 | Deng et al. | 701/41 |
| 7,359,778 B2 * | 4/2008 | Goto et al. | 701/41 |
| 7,640,089 B2 * | 12/2009 | Deng et al. | 701/42 |
| 2003/0055547 A1 * | 3/2003 | Chen et al. | 701/48 |
| 2005/0275284 A1 * | 12/2005 | Katayama | 303/146 |
| 2006/0041356 A1 | 2/2006 | Shirato et al. | |
| 2006/0069489 A1 * | 3/2006 | Chen et al. | 701/70 |

FOREIGN PATENT DOCUMENTS

| | | |
|---|---|---|
| DE | 10 2006 013 788 A1 | 9/2006 |
| DE | 10 2005 025 287 A1 | 12/2006 |
| JP | A 7-304460 | 11/1995 |
| JP | A 10-302199 | 11/1998 |
| JP | A 11-91609 | 4/1999 |
| JP | A 2001-34341 | 2/2001 |
| JP | A 2003-138954 | 5/2003 |
| JP | A 2005-132172 | 5/2005 |
| JP | A 2006-56372 | 3/2006 |

OTHER PUBLICATIONS

Aso et al., "Automated Steering Control for the Intelligent Multimode Transit System," *Proceedings of the IEEE Intelligent Vehicles Symposium*, Dearborn (MI), USA, Oct. 3-5, 2000, pp. 590-595.

Furusho et al., "Automatic Path Tracking Using Linear Quadratic Control Theory—Control Method for a Curved Path," 1997, pp. 49-52.

Office Action issued in German Patent Application No. 11 2007 002 946.3, on Sep. 30, 2010 (with translation).

* cited by examiner

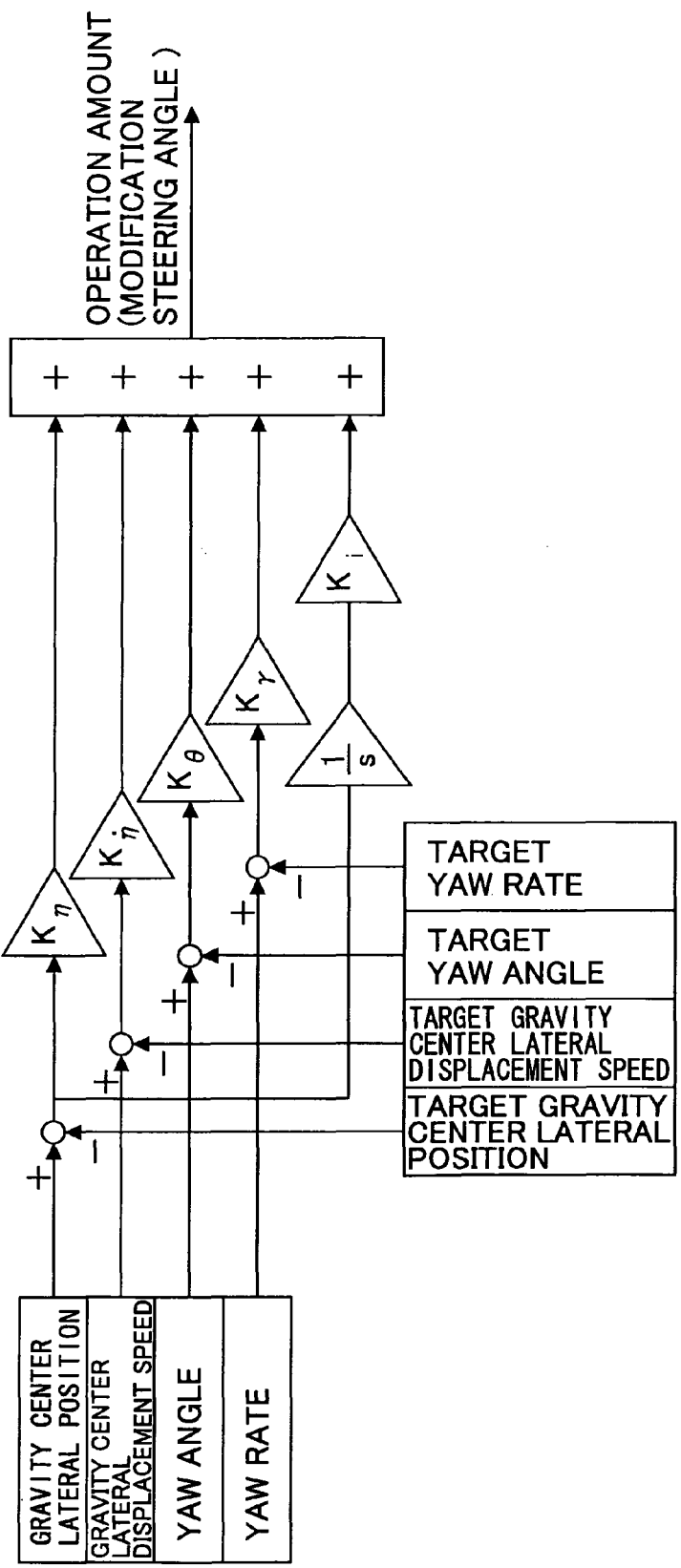

FIG.6

| RUNNING PURPOSE · SYSTEM DESIGN SPECIFICATIONS (VARIES DYNAMICALLY DUE TO TRAFFIC ENVIRONMENT AND STATUS OF OWN VEHICLE ETC.) | EXAMPLES OF OBJECTIVE FUNCTION (IN CASE OF DISCRETE-TIME SYSTEM, INTEGRAL CALCULATION IS REPLACED BY Σ CALCULATION) |
|---|---|
| RUN CLOSER TO TARGET PATH AS MUCH AS POSSIBLE (SMALLER CONTROL ERROR, HIGHER DEGREE OF FREEDOM OF PLANS) | $\frac{1}{T_h}\int_0^{T_h} \eta^2 dt$ ...(11) |
| RUN CLOSER TO TARGET PATH AS MUCH AS POSSIBLE AND WITH MINIMUM OF LATERAL POSITION FLUCTUATION (IMPROVE RIDING COMFORTABILITY, REDUCE STEERING ANGLE FLUCTUATION, ADAPTED TO LOW-μ ROAD) | $\frac{1}{T_h}\int_0^{T_h}(\eta^2+k\cdot\dot{\eta}^2)dt$ ...(12a)  $\frac{1}{T_h}\int_0^{T_h}(\eta^2+k\cdot\dot{\delta}^2)dt$ ...(12b)  $\frac{1}{T_h}\int_0^{T_h}(\eta^2+k\cdot\dot{\gamma}^2)dt$ ...(12c) (k:WEIGHTING COEFFICIENT) |
| RUN SO THAT POSITION OF POSITION DETECTION SENOR PASS NEAR TARGET PATH (IMPROVE SYSTEM ROBUSTNESS) | $\frac{1}{T_h}\int_0^{T_h}(\eta+L\cdot\theta)^2 dt$  (L:DISTANCE BETWEEN GRAVITY CENTER AND SENSOR) ...(13) |

VEHICLE CONTROL DEVICE

TECHNICAL FIELD

The present invention relates to a vehicle control device for controlling a real vehicle based on a dynamic vehicle model for modeling a motion state of the vehicle.

BACKGROUND ART

Conventionally, there has been proposed a vehicle operating system allowing a vehicle to run on a prescribed road based on automatic steering control. In the vehicle operating system, markers (magnetic markers) are installed at a prescribed interval along a vehicle-running path on a road, and a lateral displacement of the vehicle from the vehicle-running path is detected based on a detection signal output every time the vehicle passes each marker. The detection signal is output from a marker sensor mounted in the vehicle and represents a relative positional relationship between the vehicle and the marker. Based on the lateral displacement detected every time the vehicle passes the markers, an automatic steering control is conducted so as not to cause the vehicle to deviate from the vehicle-running path.

Conventionally, in such a vehicle operating system, a technique is proposed in which, to achieve more highly accurate steering control, a target state amount with respect to the lateral displacement is estimated by using a static vehicle model (a model assuming a static state) from vehicle speed and lane curvature, and the automatic steering control is conducted by performing feedback control so that an error between the estimated lateral displacement and actually detected lateral displacement is a target value (see, for example, Patent Document 1).

Patent Document 1: Japanese Patent Application Publication No. H11-91609.

Non Patent Document 1: Computational Method of Optimal Control Problem Using Mathematical Programming (2nd report) Introduction of Block Diagonal Hessian Method, Journal of Japan Society for Aeronautical and Space Science Vol. 46, No. 536, pp 497-503, 1998.

DISCLOSURE OF THE INVENTION

Problem to be Solved by the Invention

However, in the above conventional technique, a vehicle state described by the static vehicle model assuming the static state does not always correspond to a vehicle state in actual running (for example, in an actual running path, there are existing curvature-reducing parts where the curvature is not constant). Therefore disadvantageously, an error of a value calculated from such a static vehicle model may affect a following error of the real vehicle with respect to a target path. To solve the problem, it is necessary to prevent a calculation value from a vehicle model from affecting a following capability of a real vehicle. For example, it is necessary to prevent a calculation value from such a vehicle model from reducing safety during running in accordance with running plans.

In this case, instead of using such a static vehicle model, it may also be possible to use a dynamic vehicle model in which an output depends on a past record and an internal state when a phenomenon starts. However, appropriate values in initial conditions cannot always be set, and such a dynamic vehicle model cannot be solved analytically by using only running targets including a target path and curvature and is necessary to be solved numerically. As a result, a solution cannot be explicitly obtained. Because of this feature, it is not possible to determine whether a calculation result is an appropriate solution so as to follow the running targets.

To overcome the problems, an object of the present invention is to provide a vehicle control device capable of improving the following capability of a real vehicle with respect to the running targets.

Means for Solving Problem

To achieve the above object, a vehicle control device according to an embodiment of the present invention includes
an input amount calculating unit calculating an input amount for varying an operation amount necessary for an operation of an real vehicle based on a dynamic vehicle model modeling a motion state of a vehicle running in accordance with running targets including a target path;
a judging unit judging whether the input amount calculated by the input amount calculating unit satisfies prescribed running requirements with respect to the real vehicle; and
an operation amount calculating unit calculating the operation amount based on the input amount determined to satisfy the running requirements by the judging unit.

According to this configuration, when it cannot be determined whether the input amount as the solution of the dynamic vehicle model modeling the motion state of the vehicle running in accordance with the running targets including the target path is an appropriate solution for realizing following the running targets, it is possible to calculate an appropriate operation amount so that the vehicle follows the running targets by using the input amount which is the solution calculated based on the dynamic vehicle model and satisfies prescribed running requirements, thereby improving the following capability of the real vehicle with respect to the running targets.

Here, when the running requirements indicate a following method of the real vehicle with respect to the running targets, it becomes possible to improve the following capability of the real vehicle with respect to the running targets in the following method indicated by the running requirements.

Further, when the running targets are generated based on running plans of the real vehicle and the running requirements are varied in accordance with the running plans, it becomes possible to request a running adapted to the running plans positioned higher than the running targets.

Further, when the running requirements are varied in accordance with running environment of the real vehicle, it becomes possible to request a run adapted to the running environment including road conditions and traffic conditions.

Further preferably, the operation amount calculating unit calculates a feed-forward operation amount as the operation amount, the feed-forward operation amount being included in the input amount determined to satisfy the running requirements by the judging unit. By doing this, it becomes possible to perform feed-forward control enabling to realize following the running targets.

Further preferably, the vehicle control device further includes a detecting unit detecting an amount to be controlled of the real vehicle, and the operation amount calculating unit calculates a feedback operation amount based on a deviation between the amount to be controlled detected by the detecting unit and a state amount indicating the motion state of the real vehicle and included in the input amount determined to satisfy the running requirements by the judging unit. By doing this, even when disturbances occur, it is possible to reduce the influence of the disturbances and improve the following capability with respect to the running targets.

Further preferably, the judging unit determines whether the input amount satisfies the prescribed running requirements based on, for example, an evaluation function where the input amount is a variable. More preferably, the judging unit determines whether the input amount satisfies the prescribed running requirements based on a comparison between a value of the evaluation function and a prescribed threshold value. Further preferably, when there are plural variables in the evaluation function, each of the variables is weighted in accordance with the running requirements. By doing this, even when there are plural input amounts, it is possible to calculate the operation amount based on the plural input amounts weighted in accordance with the running requirements.

Further preferably, in the evaluation function, at least a deviation between a position of the real vehicle and the target path is a variable. By evaluating the following capability of the real vehicle with respect to the target path, it is possible to calculate the operation amount that enables the running conforming to the running targets.

Further preferably, the input amount calculating unit calculates an input amount by solving an optimal control problem where the dynamic vehicle model is discretized by a prescribed period interval. For example, the dynamic vehicle model is discretized assuming that the input amount in the prescribed period interval is constant. By doing this, it is possible to treat the dynamic vehicle model in a continuous-time system as the dynamic vehicle mode in a discrete-time system. Further, by solving the dynamic vehicle model as an optimal control problem, it becomes possible to calculate an optimal solution (an optimal input amount) of the dynamic vehicle model minimizing the value of the evaluation function and calculate an appropriate operation amount so that the vehicle can follow the running targets, thereby further improving the following capability of the real vehicle with respect to the running targets.

EFFECT OF THE INVENTION

According to an embodiment of the present invention, the following capability of a real vehicle with respect to the running targets may be improved.

BRIEF DESCRIPTION OF THE DRAWINGS

FIG. 5 is a drawing illustrating LQI control;

FIG. 6 shows a specific example of an objective function;

EXPLANATION OF LETTERS AND NUMERALS

Figure 1:
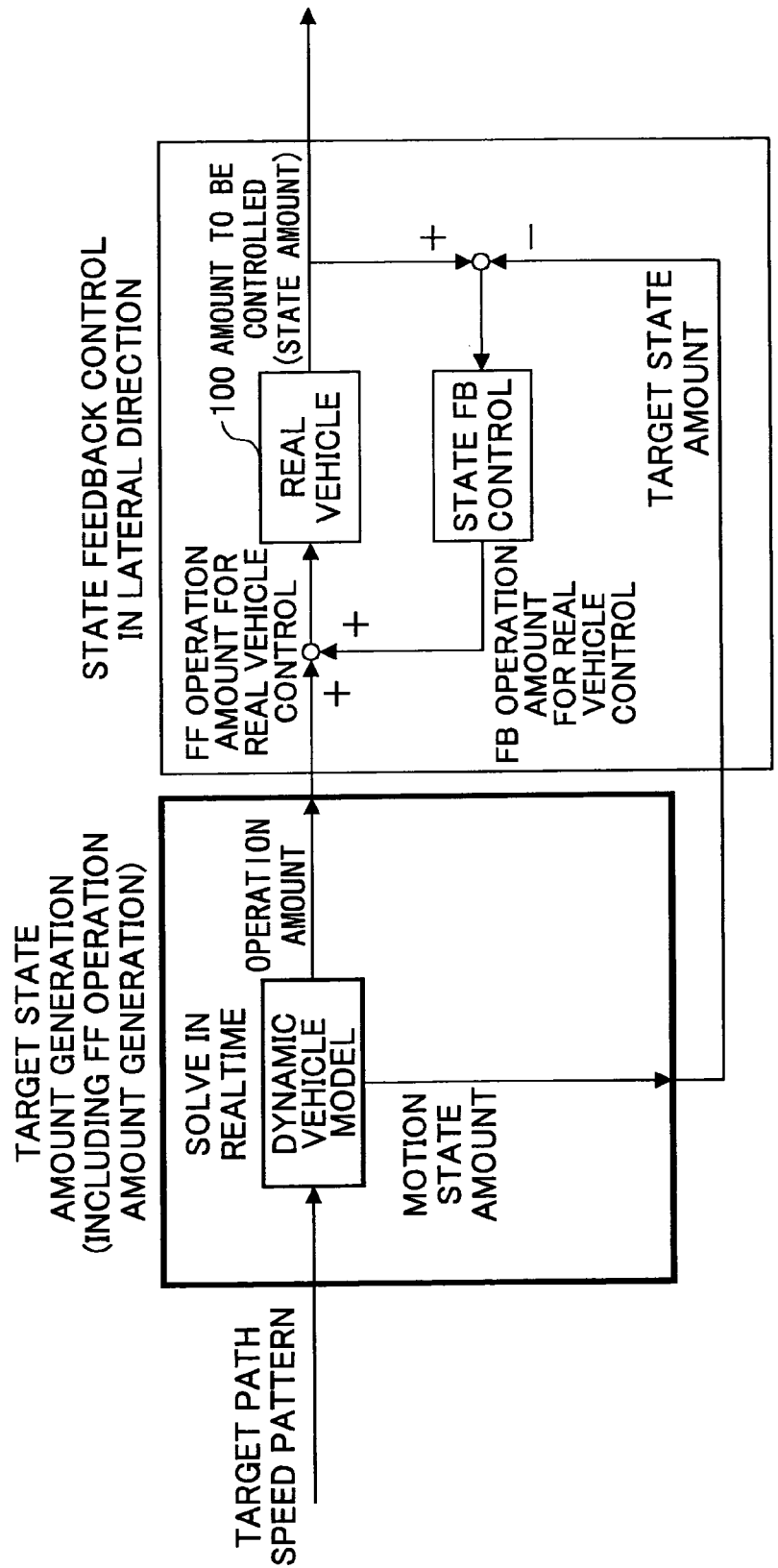
FIG. 1 is a drawing illustrating an outline of a vehicle control device according to an embodiment of the present invention.

11: GPS receiver
12: white line recognizing device
13: marker sensor
14: yaw rate sensor
15: G sensor
16: vehicle wheel speed sensor
17: steering angle sensor
20: memory unit
31: steering controlling section
32: steering actuator
50: control unit
100: vehicle
200: Kalman filter

BEST MODE FOR CARRYING OUT THE INVENTION

In the following, a best mode for carrying out the present invention is described with reference to the drawings. FIG. 1 shows an outline of a vehicle control device according to an embodiment of the present invention. The vehicle control device according to the embodiment of the present invention controls the motion of a real vehicle 100 to be controlled in a manner so that the real vehicle 100 follows running targets including a target path and a target speed (a speed pattern). In the vehicle control device according to the embodiment of the present invention, based on a dynamic vehicle model modeling the motion state of a vehicle running in accordance with the running targets including the target path and the speed pattern by using a motion equation, a feed-forward operation amount (FF operation amount) for realizing the real vehicle 100 following the running targets, thereby performing feed-forward control based on the calculated FF operation amount. On the other hand, feedback control is performed based on a deviation between actual state amounts (amounts to be controlled) representing a motion state of the real vehicle 100 and target state amounts which are the solutions of the dynamic vehicle model.

The dynamic vehicle model refers to a physics model in which outputs of the system depends on not only inputs at the time but also an internal state (initial state) when past inputs and phenomena are started. Therefore, the dynamic vehicle mode is influenced by past records, includes integral elements, and is usually described as a time-variant differential equation. On the other hand, the static vehicle model refers to a model in which outputs depend only on inputs at that time.

Figure 2:
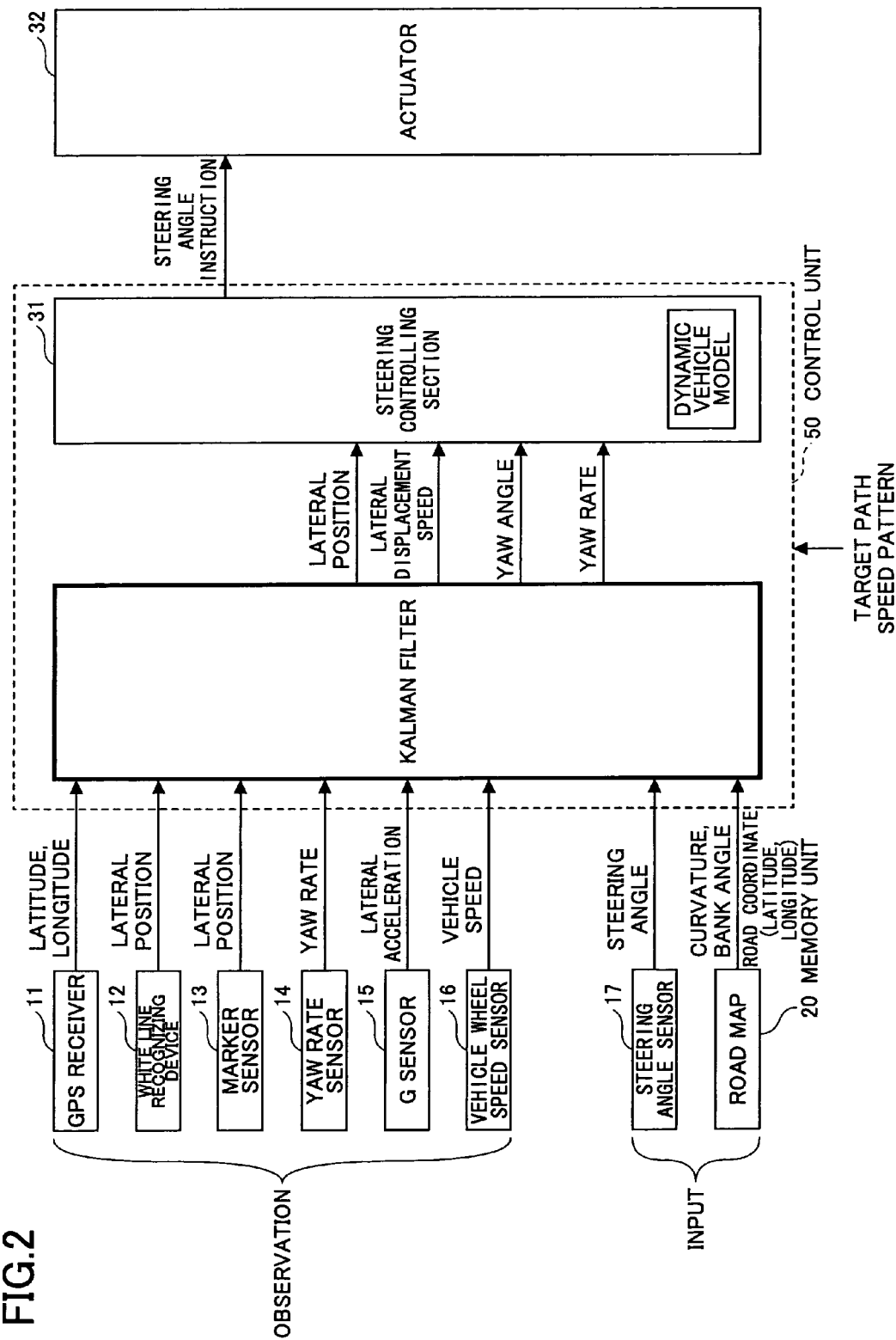
FIG. 2 is a block diagram showing a steering control device of the vehicle control device according to an embodiment of the present invention.
Figure 13:
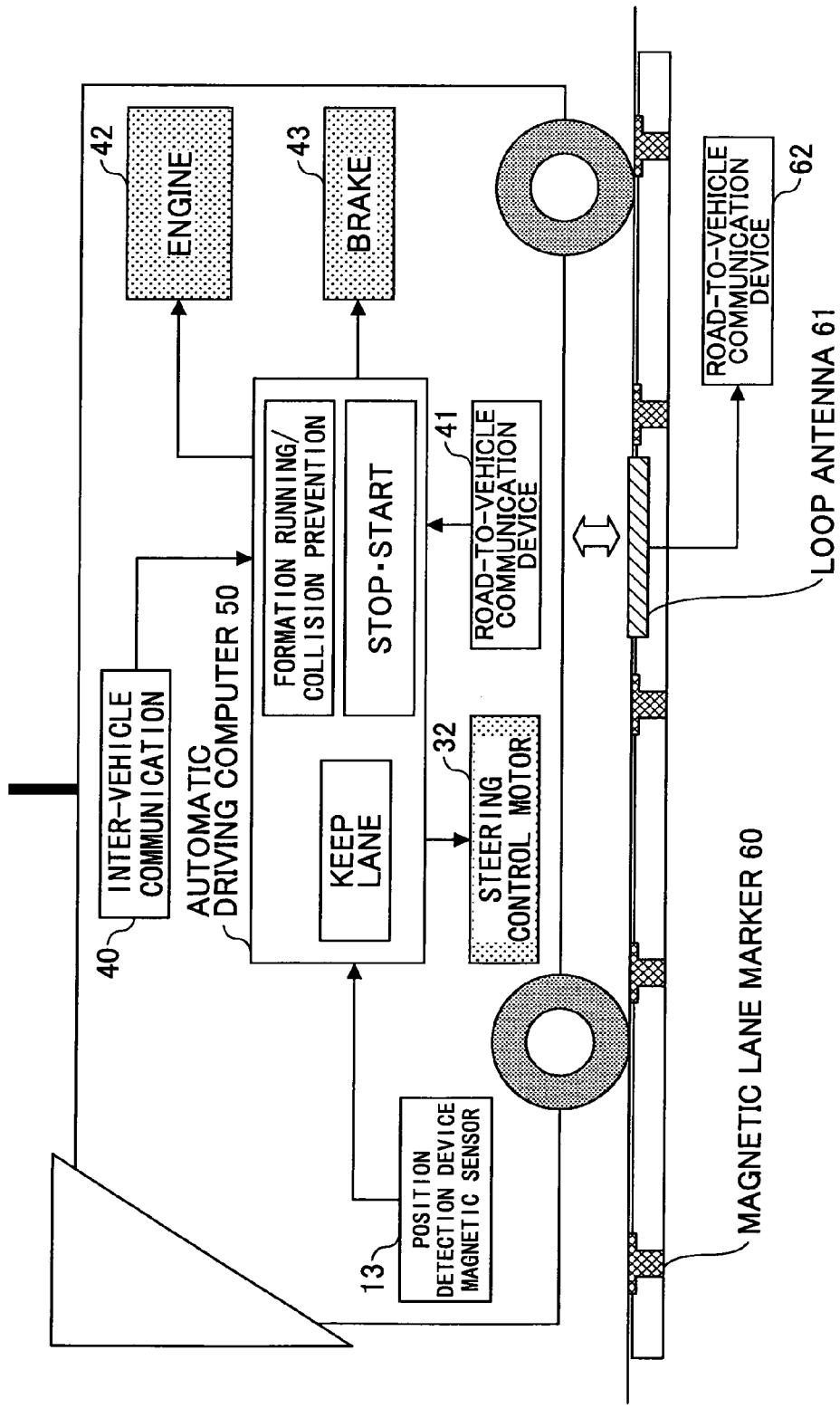
FIG. 13 is a drawing showing an exemplary configuration of an automatic vehicle operating system.

The vehicle control device as shown in FIG. 1 may be used as a steering control device controlling motion in the lateral direction of the vehicle. FIG. 2 is a block diagram showing a steering control device as a vehicle control device according to an embodiment of the present invention. The steering control device in FIG. 2 controls motion in the lateral direction of a vehicle and performs automatic steering of the vehicle based on information from a magnetic sensor 13 detecting the magnetic field from a magnetic marker 60, and external information obtained through an inter-vehicle communication device 40, and a road-to-vehicle communication device 41 so as to run along a path where magnetic markers 60 are discretely installed as shown in FIG. 13. The motion state in the lateral direction of a vehicle is influenced by factors such as a steering angle, a vehicle wheel speed, road curvature, and a bank angle (cant). In FIG. 2, among the state amounts (a yaw rate, a yaw angle, a lateral displacement speed, a lateral displacement (lateral position)) representing a motion state in the lateral direction of the vehicle, the yaw rate is autonomously observed based on a detection signal from a yaw rate sensor 14, and the lateral position is observed based on a detection signal when each magnetic marker is detected by the marker sensor 13 which may be, for example, a magnetic sensor. Further, at the same time, the lateral position may also be autonomously observed based on a detection signal from a GPS receiver 11 capable of specifying the vehicle position or a white line recognizing device 12 capable of recognizing a white line drawn along the path.

In FIG. 2, each of the GPS receiver 11, the white line recognizing device 12, the marker sensor 13, the yaw rate sensor 14, a G sensor 15, a vehicle wheel speed sensor 16, and a steering angle sensor 17 is connected to a control unit (ECU) 50. The GPS receiver 11 outputs a detection signal in accordance with coordinate information items (such as latitude and longitude) with respect to the vehicle position specified based on received information from GPS satellites. The white line recognizing device 12 outputs a detection signal in accordance with a relative positional relationship in the lateral direction of the vehicle with respect to a white line drawn along the path. The marker sensor 13 outputs a detection signal in accordance with the magnitude of a magnetic field of the magnetic markers (lane markers). Therefore, the marker sensor 13 outputs a detection signal in accordance with a relative positional relationship in the lateral direction of the vehicle with respect to the magnetic markers when the vehicle passes above each of the magnetic markers discretely installed along the path. The yaw rate sensor 14 outputs a detection signal in accordance with a raw rate of the running vehicle. The G sensor 15 outputs a detection signal in accordance with lateral acceleration of the running vehicle. The vehicle wheel speed sensor 16 outputs a pulse signal in accordance with a rotational speed (corresponding to a vehicle speed) of a wheel of the running vehicle as a detection signal. The steering angle sensor 17 outputs a detection signal in accordance with a steering angle of steering wheels.

Further, in the memory unit 20, map information items including a shape (such as a curvature, a bank angle, a number of lanes of roads, a lane width, and an altitude) of a road (path) where a vehicle runs and structures around the roads (such as houses, buildings, crossings, railroad crossings, parking, and tollgates of toll roads) as well as the coordinate data are previously stored. The control unit 50 reads the map information items from the memory unit 20 as needed. The map information items in the memory unit 50 may be updatable through inter-vehicle communications, road-to-vehicle communications, communications with an external facility such as a control center, or through a recording medium such as a CD or a DVD.

The control unit 50 includes a Kalman filter 200 and a steering controlling section 31. The Kalman filter 200 models a motion state of the vehicle 100 influenced by factors such as the steering angle, the vehicle wheel speed, the road curvature, and the bank angle, and calculates estimated values of the yaw rate, the yaw angle, the lateral displacement speed, and the lateral position by using the factors, the lateral position and the yaw rate observed as described above, and previous estimated values. The yaw rate and the lateral position actually observed constantly include noise components (measurement noise) of the yaw rate sensor, the marker sensor, the white line recognizing measurement, and the GPS measurement, and further includes a noise component inherent in the vehicle 100 (systems noise). Compared with this, by repeatedly calculating each estimated value of the state amounts (of the yaw rate, the yaw angle, the lateral displacement speed, and the lateral position) by using the Kalman filter 200, each estimated value of the state amounts converges on its real value excluding the noise components.

Therefore, when actual state amounts (amounts to be controlled) indicating the motion state of the vehicle cannot be observed due to a problem with a sensor or no sensor, the Kalman filter 200 enables performing estimated calculations of the state amounts (the yaw rate, the yaw angle, the lateral displacement speed, and the lateral position) indicating the motion state amount in the lateral direction of the vehicle.

Further, the steering controlling section 31 of the control unit 50 performs model-based control as described above with reference to FIG. 1. The steering controlling section 31 calculates an optimal steering angle so as to cause the vehicle to follow the running targets including the running path and the target speed using, for example, LQ control, based on an FF steering angle (corresponding to the FF operation amount) and the target state amounts that are calculated based on the dynamic vehicle mode of a steering system, the state amounts estimated and calculated by the Kalman filter 200, and the state amounts directly observed by the sensors, and outputs a steering control signal in accordance with the steering angle. Based on the steering control signal output from the steering controlling section 31, a steering actuator 32 provided in the steering system drives the vehicle. In accordance with the drive of the steering actuator 32, the steering of the vehicle is controlled.

Figure 3:
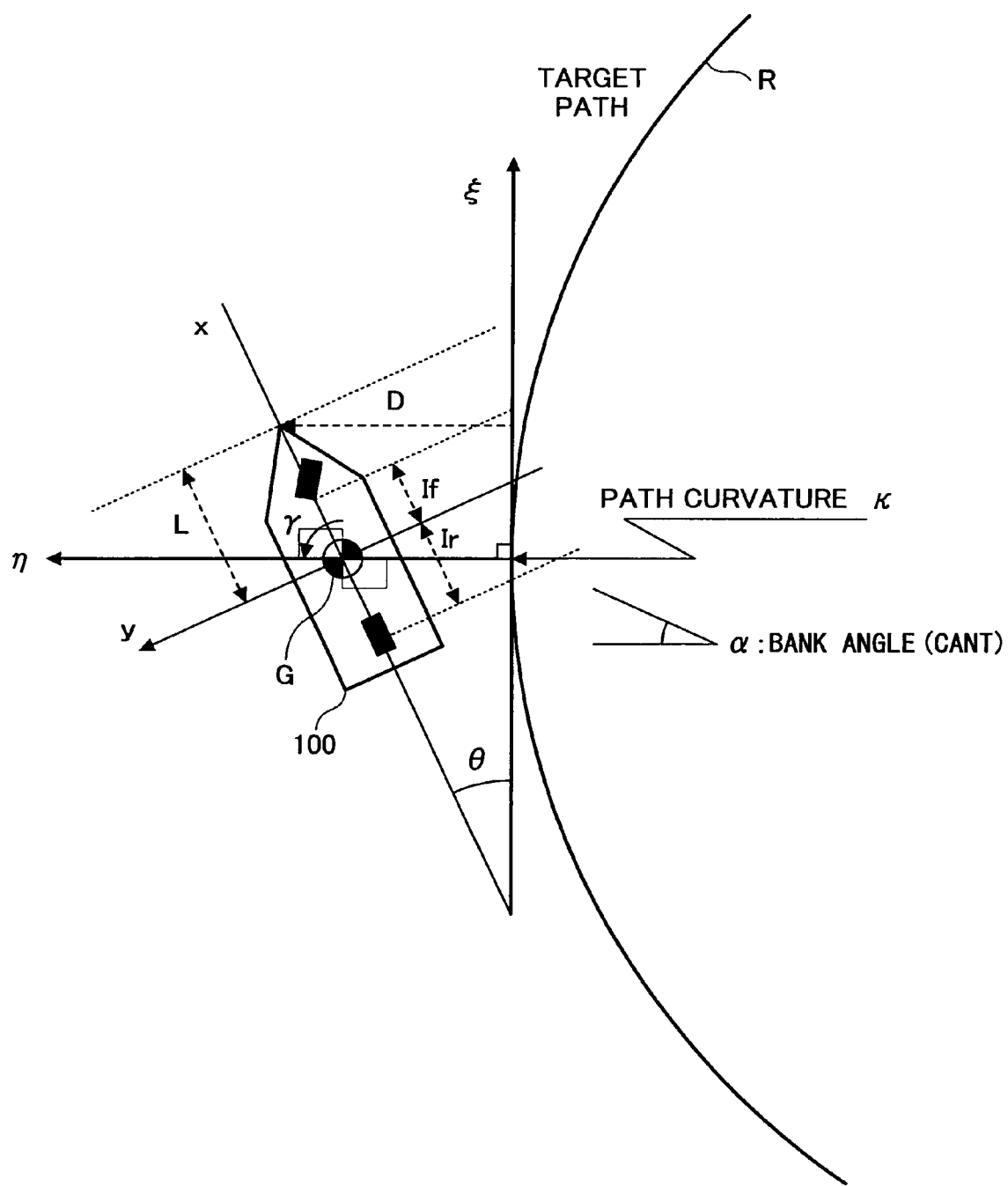
FIG. 3 is a drawing showing the definitions of coordinate systems and variables provided with respect to a modeled vehicle.

When the following are given:
State variable $x=(\eta,\eta',\theta,\gamma)^T$
Steering angle $U_c=\delta$
Unknown input $w_c=(\kappa,\alpha)^T$,
the dynamic vehicle model in the steering controlling section 31 is formulated into, for example, a state equation shown in Formula (1). The dynamic vehicle model formulated into the state equation (1) is a two-wheel vehicle model described by a coordinate system moving along the target path determined by the road curvature "$\kappa$" and the bank angle "$\alpha$" and the speed pattern determined by the vehicle speed "V". The symbol "$()^T$" represents a transposed matrix. The symbol "$\eta'$" and "dot $\eta:(\dot\eta)$" in Formulas represent the same meaning.

$$\frac{d}{dt}\begin{pmatrix}\eta\\\dot\eta\\\theta\\\gamma\end{pmatrix}=\underbrace{\begin{pmatrix}0 & 1 & 0 & 0\\0 & \frac{A_1}{V} & -A_1 & \frac{A_2}{V}\\0 & 0 & 0 & 1\\0 & \frac{A_3}{V} & -A_3 & \frac{A_4}{V}\end{pmatrix}}_{A_C}\begin{pmatrix}\eta\\\dot\eta\\\theta\\\gamma\end{pmatrix}+\underbrace{\begin{pmatrix}0\\\frac{K_f}{m}\\0\\\frac{K_f l_f}{I}\end{pmatrix}}_{B_C}\delta+\underbrace{\begin{pmatrix}0 & 0\\-V^2 & g\\-V & 0\\0 & 0\end{pmatrix}}_{B_{CW}}\begin{pmatrix}\kappa\\\alpha\end{pmatrix} \quad (1)$$

where $$A_1=-\frac{K_f+K_r}{m},\quad A_2=-\frac{K_f l_f - K_r l_r}{m}$$

$$A_3=-\frac{K_f l_f - K_r l_r}{I},\quad A_4=-\frac{K_f l_f^2 + K_r l_r^2}{I}$$

wherein, the symbol "d/dt" in the state equation (1) denotes a differential operator with respect time "t". Further, each variable in the state equation (1) is defined as follows:

η: lateral position of vehicle gravity center
η': lateral displacement speed of vehicle gravity center (lateral position differential of vehicle gravity center)
θ: yaw angle with respect to road tangent direction
γ: yaw rate
δ: steering angle
κ: path curvature (obtained from target path)
α: bank angle (obtained from target path)
V: vehicle speed (obtained from speed pattern)
g: gravity acceleration
m: vehicle mass
I: yaw inertia mass
Kf, Kr: cornering power of front and rear wheels
lf, lr: distance between gravity center and front and rear wheels
L: distance between gravity center and head of vehicle Each of the above variables is defined in a coordinate system as shown in FIG. 3. Namely, a relationship between the vehicle 100 and a path "R" is defined so that the gravity center "G" of the vehicle 100 (two-wheel model) disposes on the "η" direction perpendicular to a tangent line "ξ" of the path "R" having a curvature "κ". Further, the distances "lf" and "lr" between the gravity center "G" and the front and rear wheels, respectively, are defined in an "x-y" coordinate system having front-rear and left-right coordinate directions with respect to the gravity center "G" as the original point thereof. Further, the yaw rate "γ" as the state amount is defined as the raw rate about the gravity center "G". A lateral position "D" is defined as a distance between the path "R" and the marker sensor (provided at the head of the vehicle) in the direction parallel to the above "η" direction. The yaw angle "θ" as the state amount is defined as an angle between the tangent direction "ξ" to the path "R" and the front-rear direction ("x" direction) with respect to the vehicle.

As specific examples of calculating the FF steering angle and the target state amounts based on the dynamic vehicle model modeled by the state equation (1), "a high-gain feedback controlling method" and "an optimal control nonlinear programming method" are proposed.

Figure 4:
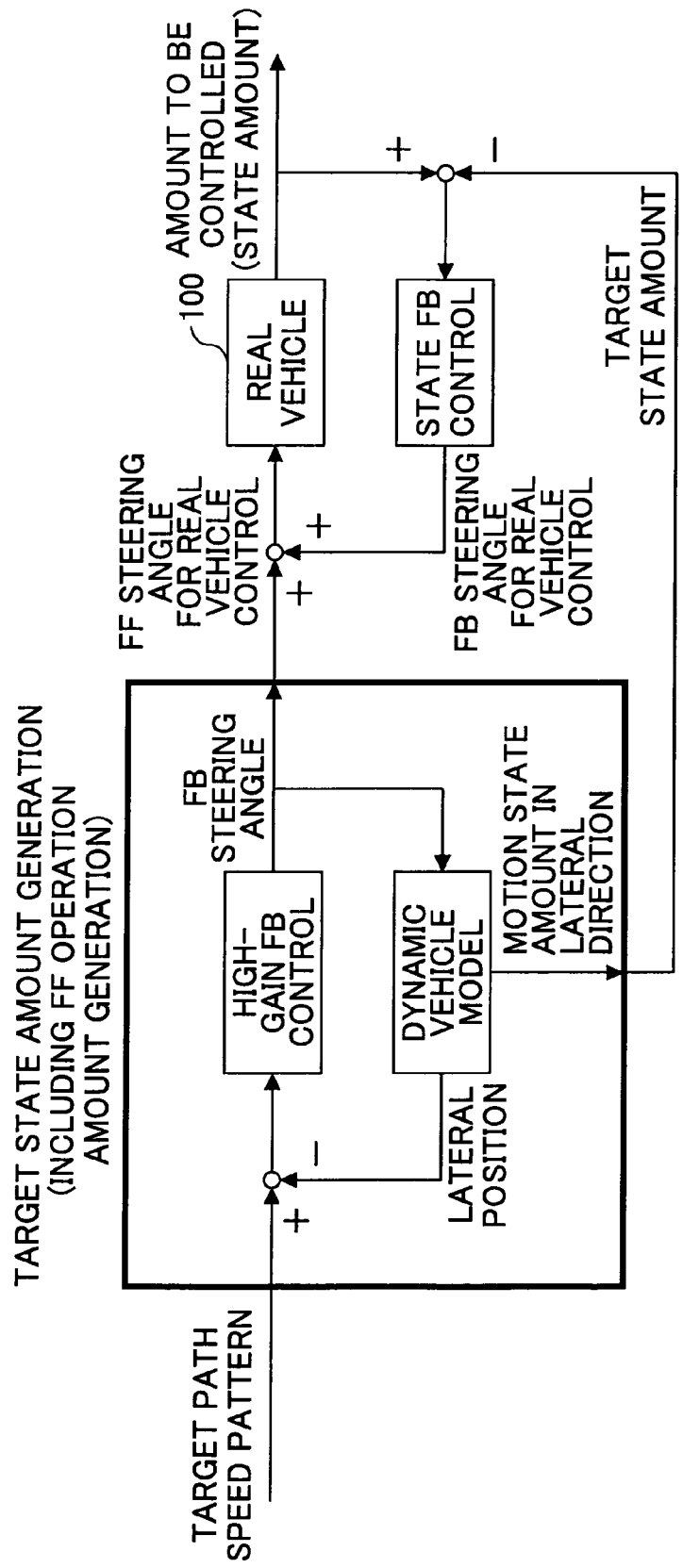
FIG. 4 is a drawing showing an example of a system configuration of a high-gain feedback control method.

FIG. 4 shows an example of a system configuration for the high-gain feedback controlling method. In the high-gain feedback controlling (high-gain FB controlling), a larger feedback gain is set so as to reduce a control deviation by using, for example, a PID control or an LQI (Linear Quadric Integral) control, so as to follow the running targets including the target path and the speed pattern with no time delay. In the following, as a calculation method of the high-gain FB control, "a real-time calculation method" per control period and "a convergence calculation method" per event are proposed.

In a real-time calculation method according to an embodiment of the present invention, in each control period, a target position (defined by the path curvature "κ" and the bank angle "α") and the target vehicle speed "V" on the target path at the present time are assigned to the dynamic vehicle model; an FB steering angle of the dynamic vehicle model is determined by performing a high-gain feedback of the control deviation; a solution of the dynamic vehicle model, between the lateral position "η" of the motion state amount in the lateral direction and the target path, and the FB steering angle is input into the dynamic vehicle model when the next calculation is performed. The FB steering angle, and the motion state amount in the lateral direction at the present time calculated per control period based on the dynamic model are assigned to an objective function "J" described below. Then, when a value of the objective function is equal to or less than a prescribed value, the FB steering angle is an FF steering angle (FF steering angle for a real vehicle control) at the present time, and the motion state amount is the target state amount at the present time.

Based on the FF steering angle and the target state amount for the real vehicle control calculated in such a real-time calculation method, the real vehicle control of actually controlling the steering of the real vehicle 100 is performed. Namely, the FB steering angle for the real vehicle control is calculated by performing a state FB control of the deviation between the set target state amount and the actual state amount (amount to be controlled) indicating the motion state observed from the real vehicle 100. Then, the sum of the FF steering angle for the real vehicle control and the FB steering angle for the real vehicle control is output as the steering control signal representing a steering operation amount in the real vehicle 100.

On the other hand, in a convergence calculation method according to an embodiment of the present invention, the target state amount for the next event is previously and accurately obtained by a convergence calculation. Herein, the event may be, for example, changing lanes, separating and merging in a junction, and accelerating and decelerating operations. These events can be defined by the target path and the speed pattern in a certain period of time. When the running targets including the target path and the speed pattern for one event are determined, the vehicle is made to run for one event in simulation, and the simulation for the one event is performed until a value of the objective function "J" described below is equal to or less than a prescribed value. The FB steering angle of the dynamic vehicle model for one event when the value of the objective function "J" is equal to or less than the prescribed value is the FF steering angle (FF steering angle for real vehicle control). Further, the motion state amount in the lateral direction for one event when the value of the objective function "J" is equal to or less than the prescribed value is the target state amount for the one event.

Based on the FF steering angle and the target state amount for the real vehicle control calculated in such a convergence calculation method, the real vehicle control of actually controlling the steering of the real vehicle 100 is performed. Namely, all of the set FF steering angle and the target state amount for the real vehicle control for one event are stored in a memory, and the FF steering angle and the target state amount for the real vehicle control corresponding to the present time in accordance with the time within the event period or progress of the running record are read from the memory. Then, the sum of the FF steering angle for the real vehicle control and the FB steering angle for the real vehicle control read in each time point in the event period is output as a steering control signal representing the steering operation amount of the real vehicle 100.

Herein preferably, for example, the PID control or the LQI control may be used to calculate the FB steering angle of the dynamic vehicle model and the FB steering angle for the real vehicle control.

When the PID control is being used, the FB steering angle can be calculated based on, for example, a PID control equation in Formula (2), wherein symbols "$K_p$", "$K_d$", and "$K_i$" denote PID parameters determined by adjustment through, for example, simulation or learning. Further, a symbol "$\eta_T$" denotes a target value (target lateral position) of the lateral position "η". The symbols "$\eta'_T$" denotes a target value (target lateral displacement speed) of the lateral displacement speed "η'".

[Expression 2]

$$\delta = K_p \cdot (\eta_T - \eta) + K_d \cdot (\dot{\eta}_T - \dot{\eta}) + K_i \cdot \int (\eta_T - \eta) dt \quad (2)$$

On the other hand, when the LQI control is being used, a state equation as shown in Formula (3) is formulated using an input amount "U" and a state amount "X". Under a controllable linear time in-variant system based on this state equation, to be able to express a control law capable of minimizing an evaluation function, it is necessary that the evaluation function be in a quadratic form expressed in Formula (4). In the LQI control, feedback gains "$K_{LQI}$" (five constant values including "$K_\eta$") that minimize a linear quadratic form evaluation function including the state amount "X" and a control amount (steering angle) "U" expressed in Formula (4). By doing this, the FB steering angle can be calculated by the Formula (5) based on the feedback gains "$K_{LQI}$" (see FIG. 5).

[Expression 3]

$$\dot{X} = AX + BU \qquad (3)$$

$$J = \int (XQX^T + URU^T)dt = \int ((q_1\eta^2 + q_2\dot{\eta}^2 + q_3\theta^2 + q_4\gamma^2 + q_5\int\eta^2) + R\delta^2)dt \qquad (4)$$

$$\delta = K_\eta \cdot (\eta_T - \eta) + K \cdot (\dot{\eta}_T - \dot{\eta}) + K_\theta \cdot (\theta_T - \theta) + K_\gamma \cdot (\gamma_T - \gamma) + K_i \int (\eta_T - \eta)dt \qquad (5)$$

Where, the symbols "X", "U", "A", and "B" in Formula (3) are expressed as follows:

[EXPRESSION 4]

$$X = \left(\eta, \dot{\eta}, \theta, \gamma, \int \eta \right)^T$$

$$U = \delta$$

$$A = \begin{pmatrix} 0 & 1 & 0 & 0 \\ 0 & \frac{A_1}{V} & -A_1 & \frac{A_2}{V} \\ 0 & 0 & 0 & 1 \\ 0 & \frac{A_3}{V} & -A_3 & \frac{A_4}{V} \\ 1 & 0 & 0 & 0 \end{pmatrix}$$

$$B = \begin{pmatrix} 0 \\ \frac{K_f}{m} \\ 0 \\ \frac{K_f l_f}{I} \\ 0 \end{pmatrix}$$

Further, the objective function "J" used in the real-time calculation method and the convergence calculation method (different from Formula (4)) can be generalized as shown in Formula (6) when a numeric calculation is performed as a continuous system, wherein a symbol "$T_h$" denotes a time period taken for the one event. In the real-time calculation method, the objective function "J" may be set in, for example, an integrand "$\phi(x,u)$" in Formula (6).

[EXPRESSION 5]

$$J = \frac{1}{T_h} \int_0^{T_h} \phi(x, u) dt \qquad (6)$$

The objective function "J" expressed in Formula (6) may be differently set depending on a following method (running requirements) of the real vehicle 100 with respect to the running targets including the running path, and, for example, may be realized according to as shown in FIG. 6. Namely, how the real vehicle 100 follows the running targets including the target path is determined depending on a running purpose and running plans including system design specifications. Therefore, the objective function "J" for evaluating the following capability of the real vehicle 100 with respect to the running targets is changed to correspond to each of the following methods each determined in accordance with the corresponding running plans.

To realize a following method for "running closer to the target path as much as possible", for example, the objective function "J" may be set as shown in Formula (11). By doing this, a control error with respect to the target path becomes smaller and a degree of freedom of the running plans becomes higher.

To realize a following method for running closer to the target path as much as possible and with minimum lateral position fluctuation, for example, the objective function "J" may be set as shown in Formula (12a) where a condition for minimizing a lateral position fluctuation of the vehicle gravity center is included; the objective function "J" may be set as shown in Formula (12b) where a condition for controlling a steering angle fluctuation (sudden steering operation) is included; or the objective function "J" may be set as shown in Formula (12c) where a condition for controlling a yaw rate fluctuation is included. By doing like this, it becomes possible to improve riding comfort and to reduce the steering angle fluctuation. Further, in the case of Formula (12c), it also becomes possible to make it harder for the vehicle to slip on a road. As the objective function "J", any one of Formulas (12a), (12b), and (12c), or any combination thereof may be set. It should be noted that plural motion state amounts are included in the integrand of the objective function "J" and adjusted by using the corresponding weighting coefficient "k" in accordance with the conditions of the following method. The coefficient "k" may be adjusted in accordance with each priority of the motion state amount in the objective function "J". Each priority (order of priority) of the motion state amount varies depending on, for example, a road condition. Specifically, in a road condition where it is preferable to control the lateral position fluctuation rather than the lateral position, a value of the coefficient "k" in Formula (12) is increased. By adjusting the weighting coefficient "k", it becomes possible to perform a fine adjustment when the vehicle follows the running targets.

Further, to realize a following method for "running so that a vehicle mounting position of a position detection sensor such as the marker sensor 13 passes near the target path, the objective function "J" may be set as shown in Formula (13). By doing this, the robustness of the system is improved.

Preferably, those following methods are dynamically varied in accordance with a running environment such as a traffic environment around the vehicle 100 and a real motion state of the vehicle 100. By doing this, it becomes possible to select a following method adapted to such situational changes and an objective function "J" corresponding to the following method. For example, when it is detected that the real vehicle 100 runs on a low-μ road, a following method adapted to the detected situation and an objective function "J" corresponding to the selected following method is selected (More specifically, for example, a following method for running closer to the target path as much as possible and with minimum lateral position fluctuation is selected, a condition for controlling the yaw rate fluctuation is added so as to make it harder for the vehicle to slip on the road, and the objective function "J" of Formula (12c) adapted to the condition is selected.)

Now, each calculation flow of the real-time calculation method and the convergence calculation method as the high-gain FB control method is described.

Figure 7:
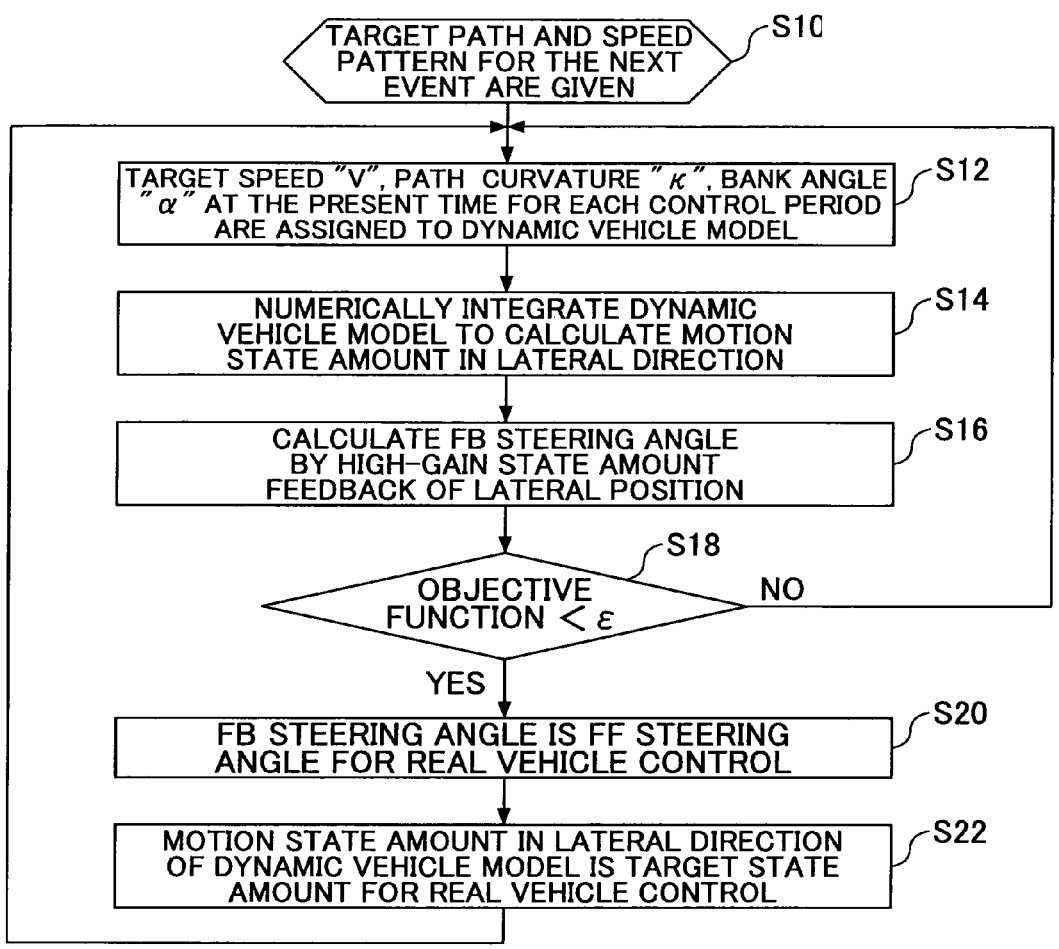
FIG. 7 is a flowchart showing a process of real-time calculation in the high-gain FB control method.

FIG. 7 is a flowchart showing a process of real-time calculation in the high-gain FB control method. This flow is repeated for each prescribed control period. When a target path and a speed pattern for the next event are given (step 10), the target speed "V" at the present time obtained from the speed pattern and the path curvature "κ" and the bank angle "α" at the present time obtained from the target path are assigned to the dynamic vehicle model (above state equation (1)) (step 12). By numerically integrating the state equation (1) of the dynamic vehicle model, a state amount "x" indicating a motion state in the lateral direction of the vehicle is calculated (step 14). An FB steering angle "δ" of the dynamic vehicle model is calculated based on Formula (2) or (5) in accordance with a high-gain state feedback control logic with respect to the lateral position "η" included in the calculated state amount "x", and the FB steering angle "δ" is input to the dynamic vehicle model for the next calculation (step 16).

The thus-calculated motion state amount "x" in the lateral direction and FB steering angle "δ" of the dynamic vehicle model are evaluated by a prescribed objective function as illustrated in FIG. 6. Namely, it is determined whether a value of the objective function to which the motion state amount "x" in the lateral direction and the FB steering angle "δ" of the dynamic vehicle model are assigned is less than a prescribed target state adequate level "ε" (step 18). An appropriate value fulfilling, for example, the system requirements through previous simulation and learning is the target state adequate level "ε". When the value of the objective function is less than the target state adequate level "ε", the FB steering angle of the dynamic vehicle model calculated in step 16 is the feedforward (FF) steering angle for the real vehicle control (step 20). Further, the motion state amount in the lateral direction calculated in step 14 is the target state amount for the real vehicle control (step 22). When the value of the objective function is not less than the target state adequate level "ε", the FF steering angle and the target state amount are unchanged as set in the previous or earlier control period.

Figure 8:
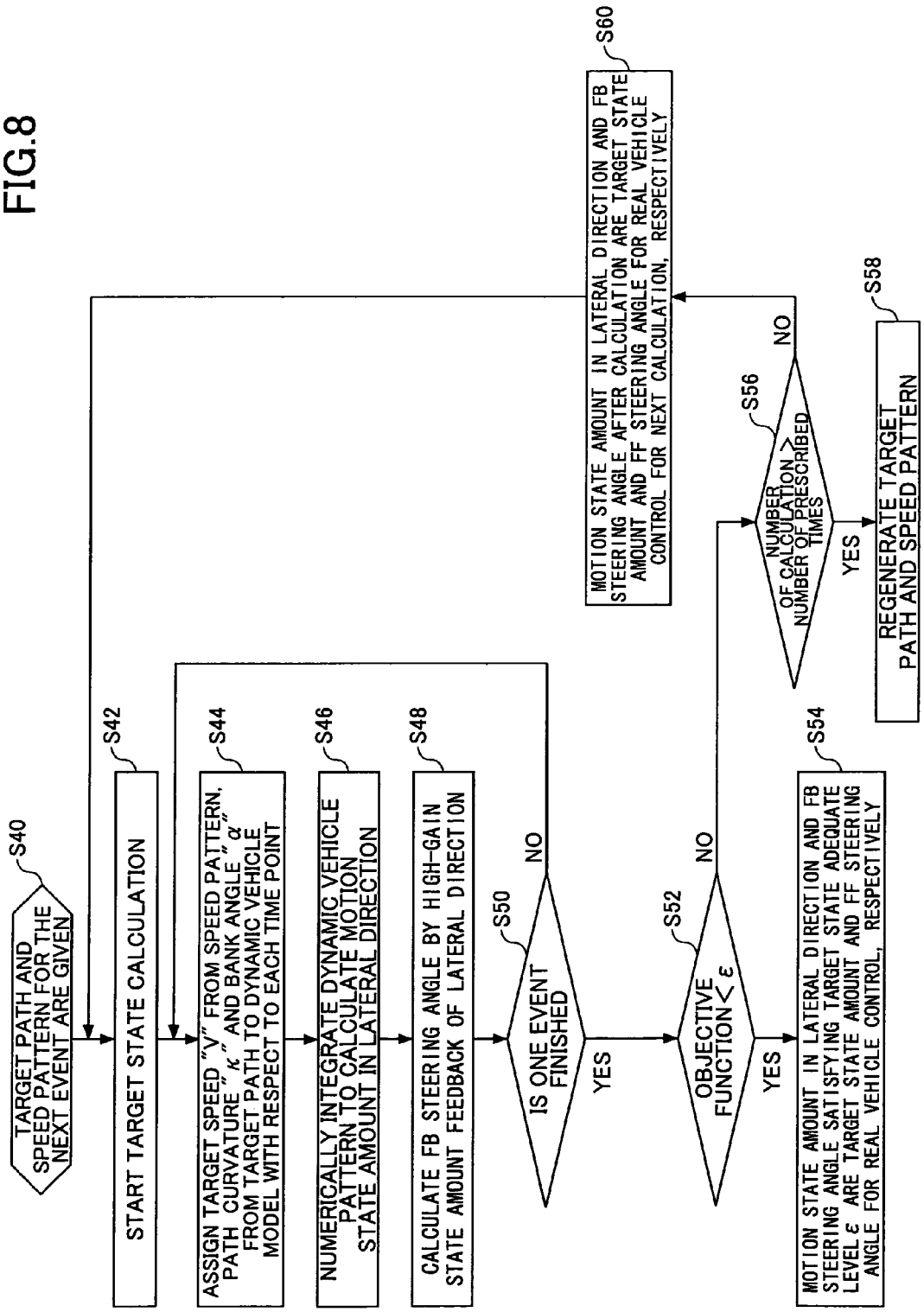
FIG. 8 is a flowchart showing a process of a convergence calculation in the high-gain FB control method.

FIG. 8 is a flowchart showing a process of a convergence calculation in the high-gain FB control method. This flow is repeated for each event occurred. When a target path and a speed pattern for the next event are given (step 40), a calculation of the target state amount starts (step 42). The target speed "V" at each time point in the event period obtained from the speed pattern and the path curvature "κ" and the bank angle "α" at each time point in the event period obtained from the target path are assigned to the dynamic vehicle model (above state equation (1)) (step 44). By numerically integrating the state equation (1) of the dynamic vehicle model, a state amount "x" indicating a motion state in the lateral direction of the vehicle is calculated (step 46). The FB steering angle of the dynamic vehicle model is calculated based on Formula (2) or (5) in accordance with the high-gain state feedback control logic with respect to the lateral position "η" included in the calculated state amount "x" in the lateral direction, and the calculated FB steering angle is assigned to the steering angle "δ" in the state equation (1) of the dynamic vehicle model (step 48). The steps above are repeated until the end of the event, namely, until the state amounts "x" and the FB steering angles for each time point in the event period are calculated (step 50).

After the calculations for one event in step 50, the calculated motion state amounts "x" in the lateral direction and the FB steering angles "δ" of the dynamic vehicle model are evaluated by a prescribed objective function as illustrated in FIG. 6. Namely, it is determined whether a value of the objective function to which the motion state amount "x" in the lateral direction and the FB steering angle "δ" of the dynamic vehicle model at each time point in the event period are assigned is less than a prescribed target state adequate level "ε" (step 52). When the value of the objective function is less than the target state adequate level "ε" (Yes in step 52), the motion state amounts in the lateral direction at each time point when the value of the objective function is less than the target state adequate level "ε" are the target state amounts for the vehicle control at the each time point, and the FB steering angles of the dynamic vehicle model at each time point when the value of the objective function is less than the target state adequate level "ε" are the FF steering angles at the each time point (step 54).

On the other hand, when the value of the objective function is not less than the target state adequate level "ε" (No is step 52), it is determined whether the number of calculation times for the one event (i.e. the number of repeat times of the execution from step 44 to step 50) exceeds a prescribed number of times (step 56). The prescribed number of times is determined to be an appropriate value fulfilling a system requirement through, for example, a simulation in advance. When the number of calculation times for the one event exceeds the prescribed number of times (Yes in step 56), it is assumed that the value of the objective function does not converge when the currently planned target path and the speed pattern given in step 40 are used, thereby regenerating the target path and the speed pattern (step 58). On the other hand, when the number of calculation times for the one event does not yet exceed the prescribed number of times (No in step 56), the motion state amount in the lateral direction after the calculation of the one event is completed is the target state amount for the calculation of the next event, and the FB steering angle of the dynamic vehicle model after the calculation of the one event is completed is the FF steering angle for the calculation of the next event, and the calculations from step 42 are repeated (step 60).

Figure 9:
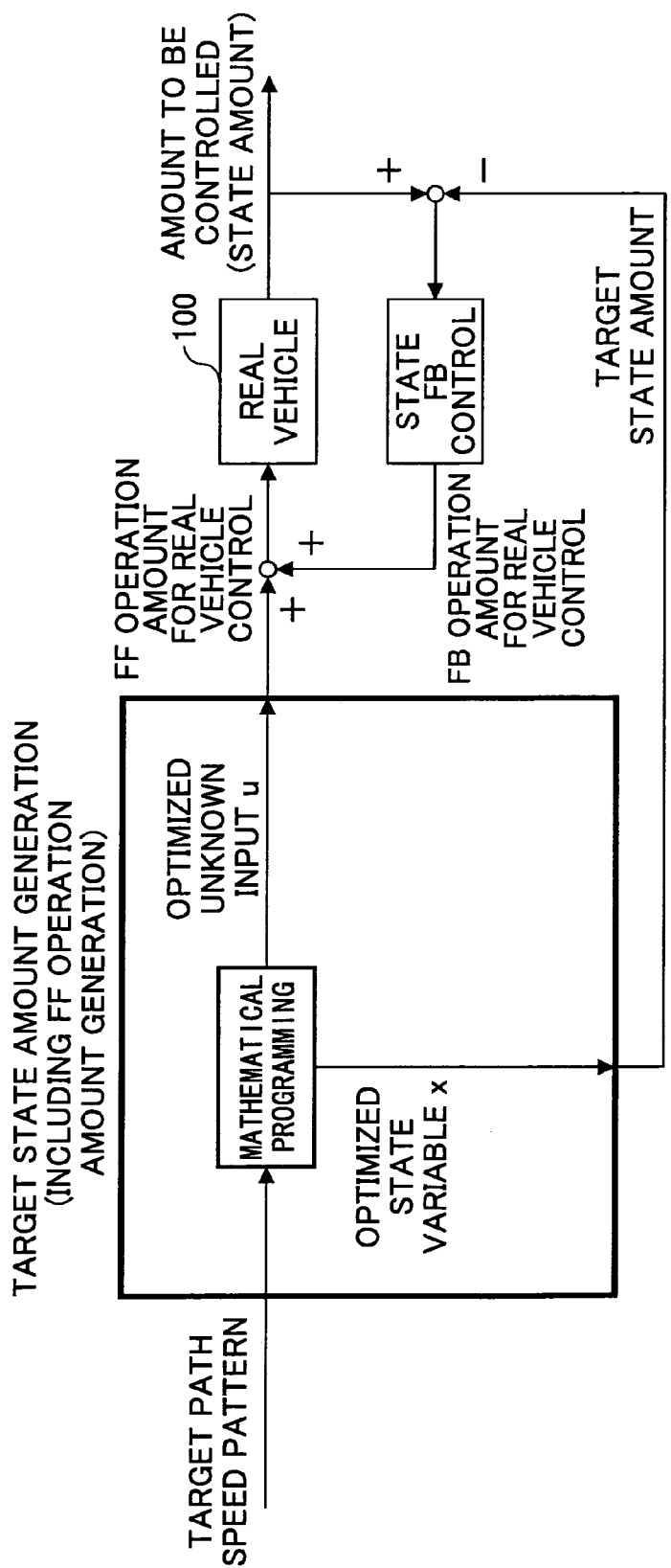
FIG. 9 is a drawing showing an example of a system configuration of a nonlinear programming method of an optimal control.

Next, as a method different from the above high-gain FB control method, "a nonlinear programming method in an optimal control problem for optimizing dynamic variables" for calculating the FF steering angle and the target state amount based on dynamic vehicle model modeled by the state equation (1) is described. FIG. 9 shows an example of a system configuration of a nonlinear programming method of an optimal control. The nonlinear programming method of an optimal control convers into a nonlinear programming problem by discretizing the control amount and the state amount of the optimal control problem, and adding a state equation as a constraint condition. Namely, a target state amount generation (including FF steering angle generation) is formulated as an optimal control problem as described below, and a state variable (state amount) "x" and an unknown input "u" minimizing the objective function are obtained as design variables. Then, the obtained state variable "x" is the target state amount, and the unknown input "u" is the FF steering angle for the real vehicle control.

Figure 10:
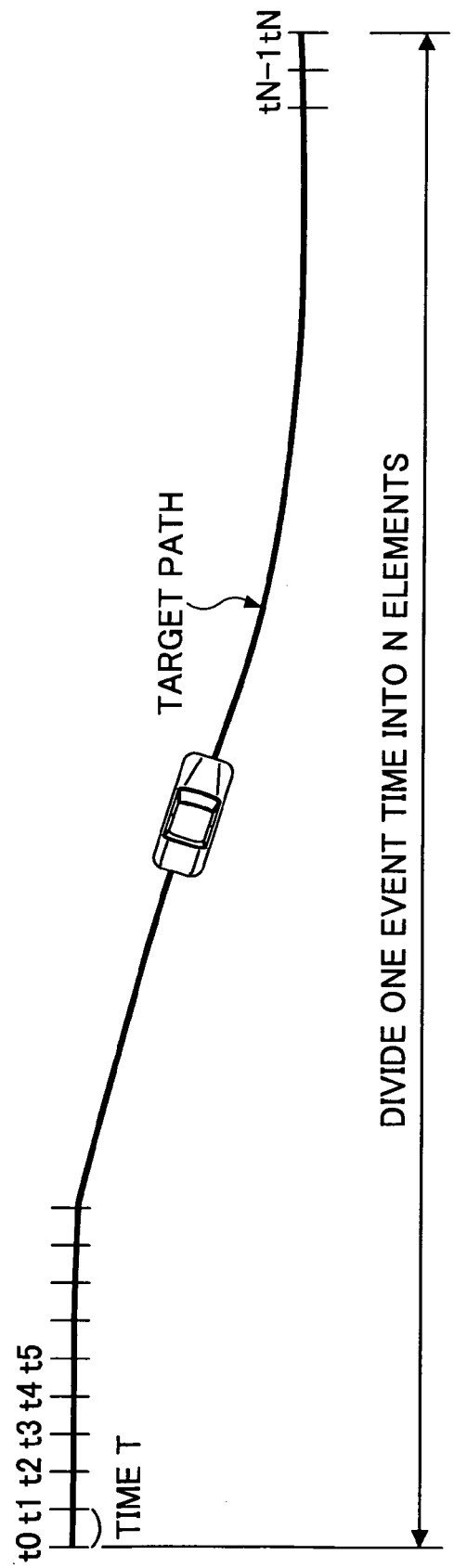
FIG. 10 is a drawing illustrating the nonlinear programming method of the optimal control.

The state equation to be calculated is the same as above Formula (1). As shown in FIG. 10, the time of one event from an initial time "$t_0$" to a final time "$t_N$" is divided into "N" elements, and the state amount "x", the unknown input "$U_c$" (δ), and a known input "$W_c$"($=(\kappa,\alpha)^T$) are discretized. A point connecting between the elements is called a node, and its time is expressed as $t_i$ (i=0, ..., N). The constraint condition that the state equation is satisfied at a time node "$t_k$" is applied.

The state equation (1) in a continuous-time system is discretized with a sampling period "T" (or a control period). When the state variable, the unknown input, and the known input are defined as follows:

state variable "$x_k$"=$(\eta_k, \eta'_k, \theta_k, \gamma_k)^T$
unknown input "$u_k$"=$\delta_k$
known input "$w_k$"=$(\kappa_k, \alpha_k)$ a state equation in a discrete-time system is formulated by a state equation as shown in, for example, Formula (7). Here, when k≦Tt<(k+1)T, "$u_c$" and "$w_c$" are constant values "$u_k$" and "$w_k$", respectively. Further, "$\kappa_k$" and "$\alpha_k$" are given from the target path, and "$V_k$" is given from the speed pattern.

[Expression 6]

$$x_{k+1} = A_s x_k + B_s u_k + B_{sw} w_k \quad (7)$$

where $A_s = \exp(A_c T)$
$B_s = \int_0^T \exp(A_c \tau) B_c d\tau$
$B_{sw} = \int_0^T \exp(A_c \tau) B_{cw} d\tau$ Further, the initial condition when the initial time t=0 and the final condition when the final time t=tf are given as shown in Formulas (8) and (9), respectively. For example, in the case of lane change, "$x_0 = x_N = (0,0,0,0)^T$" is to be set. In the optimal control problem, from among the solutions satisfying the above condition, the state variable "$x_k$" and unknown input "$u_k$" that minimize the evaluation function "J" are obtained.

[EXPRESSION 7]

$$x(t_0) = x_0 \quad (8)$$

$$x(t_N) = x_N \quad (9)$$

$$J = \frac{1}{N+1} \sum_{i=0}^{N} \phi(x_i, u_i) = \frac{1}{N+1} \sum_{i=0}^{N} \eta_i^2 \quad (10)$$

By formulated as above, it is possible to result in an evaluation function minimizing problem having a linear equation constraint condition with respect to the design variables "x" and "u". Namely, the optimal control problem can be converted into the nonlinear programming problem. Once it becomes possible to convert like this, the problem can be solved using a general optimization method based on a mathematical programming (see, for example, Non Patent Document 1). Non Patent Document 1 discloses a BDH method for solving a problem. As other methods, there are, for example, a DCNLP method and a "fimicon" (search for the minimum value of the constrained nonlinear multivariable function), and a "quadprog" (method of solving a quadratic programming problem) of an MATLAB (registered trademark).

Figure 11:
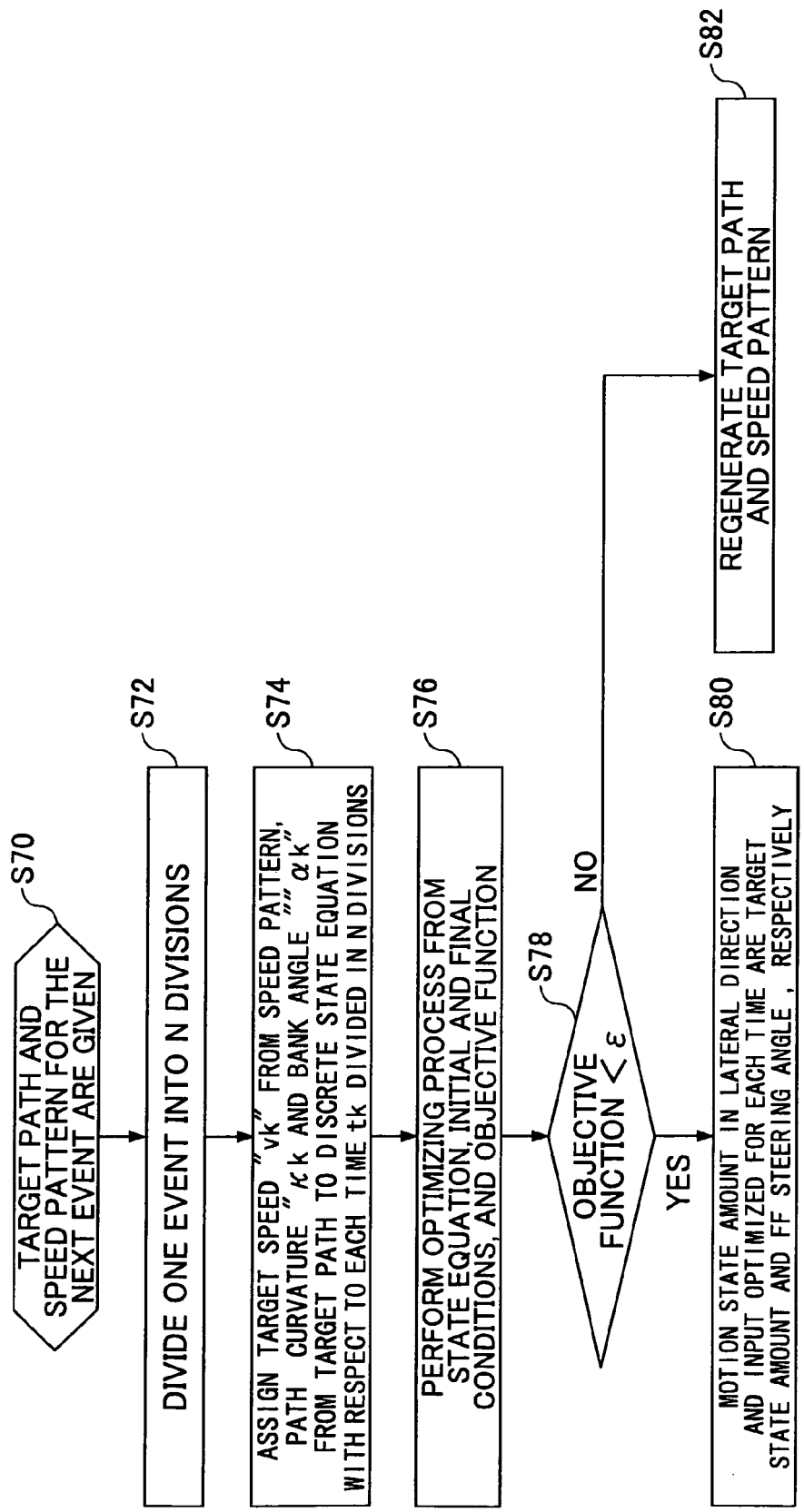
FIG. 11 is a flowchart showing a process of the nonlinear programming method of the optimal control.

FIG. 11 is a flowchart of the nonlinear programming method of the optimal control. This flow is repeated for each event occurred. When a target path and a speed pattern for the next event are given (step 70), the time of one event is divided into "N" divisions (step 72). The target speed "$V_k$" obtained from the speed pattern and the path curvature "$\kappa_k$" and the bank angle "$\alpha_k$" obtained from the target path are assigned to the discrete state equation (3) at N-divided each time "tk" (step 74). With respect to the discrete state equation (7), the initial and final conditions (8)(9), and objective function (10), an optimization processing in the optimal control problem is performed based on the above solving method (step 76). Namely, in step 76, the state variable "$x_k$" and the unknown input "$u_k$" that minimizes the value of evaluation function (10) (further reduces the target state adequate level "ϵ") are obtained. When the state variable "$x_k$" and the unknown input "$u_k$" that minimize the value of evaluation function (10) are obtained (Yes in step 78), the state variables at each time point when the value of the objective function (10) is less than the target state adequate level "ϵ" are the target state amounts for the vehicle control at the each time point, and the FB steering angles at each time point when the value of the objective function (10) is less than the target state adequate level "ϵ" are the FF steering angles for real vehicle control at the each time point (step 80).

On the other hand, in step 76, when the state variable "$x_k$" and the unknown input "$u_k$" that minimize the value of evaluation function (10) are not obtained (No in step 78), it is assumed that the value of the objective function (10) does not converge when the currently planned target path and the speed pattern given in step 70 are used, thereby regenerating the target path and the speed pattern (step 82).

Based on the FF steering angle and the target state amount calculated by the nonlinear programming method of such an optimal control problem, a real vehicle control actually controlling the steering of the real vehicle 100 is executed. Namely, all of the set FF steering angles and the target state amounts for the set one event are stored in a memory, and the FF steering angle and the target state amount at the present time point during the event period are read from the memory. The FB steering angle for the real vehicle control is calculated by performing a state FB control of the deviation between the target state amount read at each time point in the event period and the actual state amount (amount to be controlled) indicating the motion state observed from the real vehicle 100. Then, the sum value of the FF steering angle for the real vehicle control read at each time point in the event period and the FB steering angle for the real vehicle control is output as the steering control signal representing a steering operation amount in the real vehicle 100.

Figure 12:
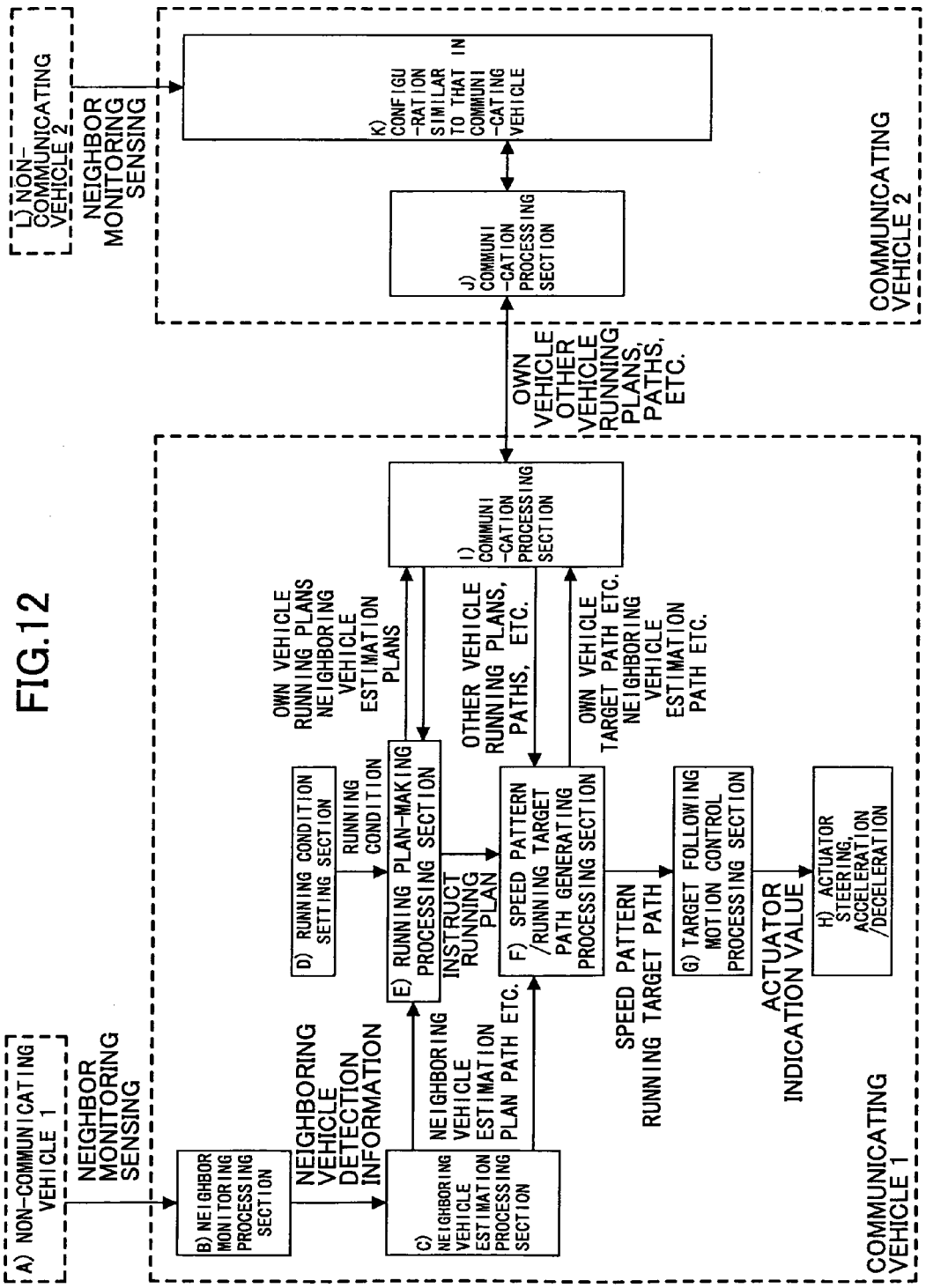
FIG. 12 is a block diagram showing a configuration for performing a multi-layer control target generating method.

Though the running targets such as the target path and the speed pattern are assigned as the known input to the dynamic vehicle model expressed in a state equation, a multi-layer control target generating method as an example of a setting method of those running targets is described. FIG. 12 is a block diagram showing a configuration for performing a multi-layer control target generating method.

A running condition setting section "D" sets a destination of the vehicle 100 and whole running conditions such as a desired travelling time, a gas mileage priority level, and a rest schedule. The weighting based on a priority level among those elements are determined through, for example, the driver's instruction information and learning.

A running plan-making processing section "E" determines running plans such as the desired travelling time between an interchange, a service area, and a parking area based on the whole running conditions set by the running condition setting section, map information and traffic information obtained through, for example, a vehicle navigation system, and traffic information from, for example, the VICS (Vehicle Information and Communication System) and other vehicles. Further, the running plan-making processing section "E" determines running plans of, for example, changing lanes, changing the upper limit speed, changing the following distance within a prescribed distance range (for example, 200 meters) from each time point based on the surrounding status of the own vehicle. The running plan-making processing section "E" acquires the surrounding status of the own vehicle (for example, running plans of other vehicles) through a neighboring vehicle estimation processing section "C" and a communication processing section "I". The neighboring vehicle estimation processing section "C" estimates the running plans of a non-communicating vehicle 1 based on the monitoring results with respect to the non-communicating vehicle 1 by a neighbor monitoring processing section "B" such as radar and a camera. Further, the communication processing section "I" obtains from a communicating vehicle 2 having a similar function as the own vehicle has the running plans of the communicating vehicle 2 and running plans of the non-communicating vehicle 1 that the communicating vehicle 2 has.

A speed pattern/running target path generating processing section "F" generates the running targets (namely, the running path and the speed pattern as described above) such as a target position, a target speed, and a lateral position where the vehicle should be placed for each control period (for example, 48 meters) within a prescribed range from each time point based on the running plans determined by the running plan-making processing section "E". The generated running plans are varied in accordance with the surrounding status by cooperating with the neighboring vehicles through, for example, the inter-vehicle communications.

A target following motion control processing section "G" calculates the steering control signal (actuator indicating value) in a manner so that the vehicle follows the running plans generated by the speed pattern/running target path generating processing section "F". An actuator "H" operates so as to perform the steering and acceleration/deceleration operations in accordance with the indicating value.

Therefore, according to an embodiment of the present invention, even when it cannot be determined whether the motion state amount in the lateral direction and the FB steering angle as the solutions of the state equations (1) and (7) modeling the motion state of the running vehicle in accordance with the running targets such as the target path and the speed sensor are appropriate solutions for realizing to follow the running targets, it is possible to calculate appropriate FF steering angle and FB steering angle so that the vehicle follows the running targets by using the motion state amount in the lateral direction and the FB steering angle which are the solutions calculated based on the state equations and satisfies a prescribed following method, thereby improving the following capability of the real vehicle with respect to the running targets.

Further, according to an embodiment of the present invention, by introducing the objective function (evaluation function) for evaluating the following capability of the vehicle with respect to the running targets and evaluating the motion state amount in the lateral direction and the FB steering angle which are solutions obtained by numerically solving the dynamic vehicle model that cannot be solved analytically, it becomes possible to determine whether the obtained solutions can improve the following capability of the vehicle with respect to the running targets. When the motion state amount in the lateral direction and the FB steering angle evaluated to be able to improve the following capability are used, it is accordingly possible to improve the following capability of the real vehicle with respect to the running targets.

Though exemplary embodiments of the present invention are described above, the present invention is not limited to the embodiments and various modifications and substitutions can be made without departing the scope of the present invention.

For example, the setting method of the running targets such as the target path and the speed pattern is not limited to the multi-layer control target generation method, and any method may be used as long as the numeral values defining the target path and the speed pattern in a prescribed section are the known input of the dynamic vehicle model.

Further, as the operation amount for the real vehicle control, the steering angle is calculated. However, a driving torque difference between left and right wheels may be used as the operation amount.

The present application claims priority from Japanese Patent Application No. 2006-330884 filed on Dec. 7, 2006, the entire contents of which are hereby incorporated herein by reference.

The invention claimed is:

1. A vehicle control device comprising:
an input amount calculating unit that calculates an input amount for varying an operation amount necessary for an operation of a real vehicle based on a dynamic vehicle model modeling a motion state of a vehicle running in accordance with running targets including a target path;
a judging unit that determines whether the input amount satisfies prescribed running requirements based on an evaluation function where the input amount is a variable, the prescribed running requirements indicating a following method of the real vehicle with respect to the running targets; and
an operation amount calculating unit that calculates the operation amount based on the input amount determined to satisfy the prescribed running requirements by the judging unit, wherein
the input amount includes a calculated feedforward or feedback control.

2. The vehicle control device according to claim 1, wherein
the running targets are generated based on running plans of the real vehicle, and the prescribed running requirements are varied in accordance with the running plans.

3. The vehicle control device according to claim 1, wherein
the prescribed running requirements are varied in accordance with running environment of the real vehicle.

4. The vehicle control device according to claim 1, wherein
the operation amount calculating unit calculates a feed-forward operation amount as the operation amount, the feed-forward operation amount being included in the input amount determined to satisfy the prescribed running requirements by the judging unit.

5. The vehicle control device according to claim 1, further comprising:
a detecting unit that detects an amount to be controlled of the real vehicle, wherein
the operation amount calculating unit calculates a feedback operation amount based on a deviation between the amount to be controlled detected by the detecting unit and a state amount that is included in the input amount determined to satisfy the prescribed running requirements by the judging unit and that indicates a motion state of the real vehicle.

6. The vehicle control device according to claim 1, wherein
when there are plural variables in the evaluation function, each of the variables is weighted in accordance with the prescribed running requirements.

7. The vehicle control device according to claim 1, wherein
in the evaluation function, at least a deviation between a position of the real vehicle and the target path is a variable.

8. The vehicle control device according to claim 1, wherein the judging unit determines whether the input amount satisfies the prescribed running requirements based on a comparison between a value of the evaluation function and a prescribed threshold value.

9. The vehicle control device according to claim 1, wherein the input amount calculating unit calculates the input amount by solving an optimal control problem where the dynamic vehicle model is discretized by a prescribed period interval.

10. The vehicle control device according to claim 9, wherein the dynamic vehicle model is discretized assuming that the input amount in the prescribed period interval is constant.

11. The vehicle control device according to claim 1, wherein the operation amount is a steering angle.

12. The vehicle control device according to claim 4, further comprising:
a detecting unit that detects an amount to be controlled of the real vehicle, wherein
the operation amount calculating unit calculates a feedback operation amount based on a deviation between the amount to be controlled detected by the detecting unit and a state amount that is included in the input amount determined to satisfy the prescribed running requirements by the judging unit and that indicates a motion state of the real vehicle.

* * * * *